United States Patent
Hayashi et al.

(10) Patent No.: US 10,165,503 B2
(45) Date of Patent: Dec. 25, 2018

(54) MOBILE STATION DEVICE AND BASE STATION DEVICE

(71) Applicant: Sharp Kabushiki Kaisha, Sakai, Osaka (JP)

(72) Inventors: Takashi Hayashi, Sakai (JP); Toshizo Nogami, Sakai (JP); Kazuyuki Shimezawa, Sakai (JP); Wataru Ouchi, Sakai (JP); Naoki Kusashima, Sakai (JP); Alvaro Ruiz Delgado, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 40 days.

(21) Appl. No.: 15/321,273

(22) PCT Filed: Jun. 8, 2015

(86) PCT No.: PCT/JP2015/066468
§ 371 (c)(1),
(2) Date: Dec. 22, 2016

(87) PCT Pub. No.: WO2016/002441
PCT Pub. Date: Jan. 7, 2016

(65) Prior Publication Data
US 2017/0164273 A1    Jun. 8, 2017

(30) Foreign Application Priority Data
Jul. 4, 2014 (JP) .................................. 2014-138437

(51) Int. Cl.
*H04W 48/16* (2009.01)
*H04W 8/24* (2009.01)
(Continued)

(52) U.S. Cl.
CPC .............. *H04W 48/16* (2013.01); *H04L 5/14* (2013.01); *H04W 8/24* (2013.01); *H04W 16/14* (2013.01); *H04W 72/04* (2013.01)

(58) Field of Classification Search
CPC ..... H04W 72/042; H04W 4/70; H04W 24/00; H04W 48/16; H04W 88/02
See application file for complete search history.

(56) References Cited

U.S. PATENT DOCUMENTS

2012/0094681 A1    4/2012  Freda et al.
2012/0184281 A1*   7/2012  Kim .................. H04W 72/0453
                                                    455/450

(Continued)

FOREIGN PATENT DOCUMENTS

JP    2014-500685 A    1/2014
JP    2014-090396 A    5/2014

(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 11); 3GPP TS 36.331; V11.8.0; Jun. 2014; pp. 1-354.

(Continued)

*Primary Examiner* — Thai Nguyen
(74) *Attorney, Agent, or Firm* — Keating & Bennett, LLP

(57) ABSTRACT

In a radio communication system in which a supplemental uplink-downlink configuration can be used, a mobile station device and a base station device efficiently communicate with each other. A mobile station device communicates in prescribed bands. This mobile station device transmits information related to support of a specific uplink-downlink configuration.

12 Claims, 9 Drawing Sheets

(51) Int. Cl.
*H04W 72/04* (2009.01)
*H04L 5/14* (2006.01)
*H04W 16/14* (2009.01)

(56) References Cited

U.S. PATENT DOCUMENTS

| | | |
|---|---|---|
| 2014/0161002 A1* | 6/2014 | Gauvreau ............ H04W 16/24 370/280 |
| 2015/0055521 A1 | 2/2015 | Seo et al. |
| 2015/0078221 A1 | 3/2015 | Seo et al. |
| 2015/0085782 A1 | 3/2015 | Seo et al. |
| 2015/0131536 A1 | 5/2015 | Kaur et al. |
| 2015/0264679 A1 | 9/2015 | Uchino et al. |

FOREIGN PATENT DOCUMENTS

| | | |
|---|---|---|
| WO | 2012/139301 A1 | 10/2012 |
| WO | 2013/151394 A1 | 10/2013 |
| WO | 2016/003610 A1 | 1/2016 |

OTHER PUBLICATIONS

Official Communication issued in International Patent Application No. PCT/JP2015/066468, dated Aug. 11, 2015.
NTT Docomo, Inc., "Proposal for a configuration for Supplemental Downlink for TD-LTE", 3GPP TSG-RAN #64, RP-140710, Jun. 10-13, 2014, pp. 1-3.

\* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |
| 7 | - | D | D | D | D | D | D | D | D | D | D |

FIG. 9

MOBILE STATION DEVICE AND BASE STATION DEVICE

TECHNICAL FIELD

The present invention relates to a mobile station device and a base station device.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered. In LTE, a base station device is also referred to as an evolved NodeB (eNodeB), and a mobile station device is also referred to as user equipment (UE). LTE is a cellular communication system in which an area is divided into a plurality of cells to form a cellular pattern, each of the cells being served by a base station device. A single base station device may manage a plurality of cells.

LTE supports a time division duplex (TDD). LTE that employs a TDD scheme is also referred to as TD-LTE or LTE TDD. TDD is a technology that enables full duplex communication in a single frequency band by performing time division multiplexing on an uplink signal and a downlink signal.

In 3GPP, discussion regarding further expanding TD-LTE is taking place. For example, discussion regarding further expanding the uplink-downlink configurations that are configurable under present TD-LTE is taking place.

NPL 1 proposes, as a supplemental uplink-downlink configuration, an uplink-downlink configuration where all subframes in a single radio frame are configured as downlink subframes (downlink only configuration/10:0 configuration/supplemental downlink configuration).

CITATION LIST

Non Patent Literature

NPL 1: "Proposal for a configuration for Supplemental Downlink for TD-LTE", RP-140710, NTT DOCOMO, 3GPP TSG-RAN #64, Sophia Antipolis, France, 10-13 Jun. 2014

SUMMARY OF INVENTION

Technical Problem

However, there has not been sufficient research into technology for notifying a base station device as to whether or not a mobile station device supports features related to the supplemental uplink-downlink configuration in the radio communication system described above. In light of the foregoing, an object of the present invention is to provide a mobile station device and a base station device that enable efficient communication in a radio communication system in which a supplemental uplink-downlink configuration can be used.

Solution to Problem (1) In order to accomplish the object described above, the present invention is contrived to provide the following means. Specifically, a mobile station device of the present invention that communicates in a prescribed band is configured to transmit information related to support of a specific uplink-downlink configuration.

(2) A mobile station device for which communication in a prescribed band is supported is configured to transmit information related to support of communication in an unlicensed band.

(3) A base station device that communicates with a mobile station device for which communication in a prescribed band is supported is configured to receive information related to support of a specific uplink-downlink configuration.

(4) A base station device that communicates with a mobile station device for which communication in a prescribed band is supported is configured to receive information related to support of communication in an unlicensed band.

Advantageous Effects of Invention

According to this invention, a mobile station device and a base station device can efficiently communicate with each other in a radio communication system in which the supplemental uplink-downlink configuration can be used.

BRIEF DESCRIPTION OF DRAWINGS

FIG. 9 is a diagram illustrating one example of an uplink-downlink configuration according to the present embodiment.

DESCRIPTION OF EMBODIMENT

Figure 1:
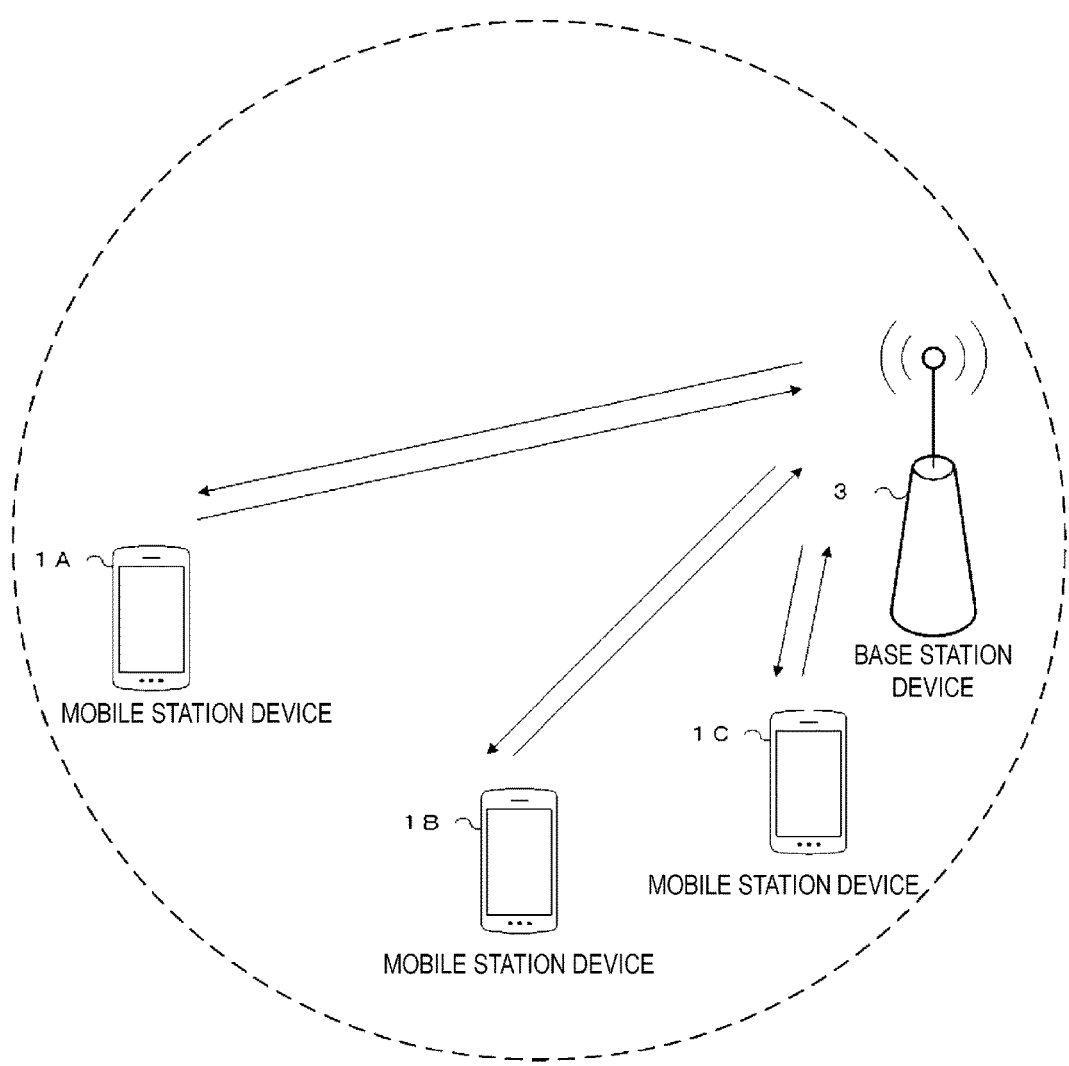
FIG. 1 is a conceptual diagram of a radio communication system according to the present embodiment.

An embodiment of the present invention will be described below.

According to the present embodiment, a plurality of cells are configured for a mobile station device. A technology in which a mobile station device performs communication by using the plurality of cells is referred to as cell aggregation or carrier aggregation. The present invention may be applied to each of the cells configured for the mobile station device. Furthermore, the present invention may be applied to some of the configured plurality of cells. The cell configured for the mobile station device is also referred to as a serving cell.

The configured plurality of serving cells include one primary cell and one or a plurality of secondary cells. The primary cell is a serving cell in which an initial connection establishment procedure has been performed, a serving cell in which a connection re-establishment procedure has been started, or a cell indicated as a primary cell during a handover procedure. At a point of time when a radio resource control (RRC) connection is established, or later, a secondary cell may be configured. Note that the plurality of cells are preferably identified by a cell index (also referred to as "cell identifier" or "cell identity"). The cell index of the primary cell is "0". The cell index(es) of the secondary cell(s) is(are) any integer from "1" to "7" and is(are) configured by a higher layer. For example, in a case where communication is carried out in one primary cell and two secondary cells, the cells may be identified by setting the cell index of the primary cell to "0", the cell index of the first secondary cell to "1", and the cell index of the second secondary cell to "2".

A time division duplex (TDD) scheme is applied to a radio communication system according to the present embodiment. In a case of cell aggregation, the TDD scheme may be applied to all of the plurality of cells. Furthermore, in the case of cell aggregation, a cell to which the TDD scheme is applied and a cell to which a frequency division duplex (FDD) scheme is applied may be aggregated. In a case where the cell to which the TDD is applied and the cell to which the FDD is applied are aggregated, the present invention can be applied to the cell to which the TDD is applied.

The mobile station device transmits a parameter (supportedBandListEUTRA) that includes information indicating the bands in which communication is supported by the mobile station device, to the base station device. Note that the parameter (supportedBandListEUTRA) may include information indicating the bands in which communication is not supported by the mobile station device. The number of bands in which communication is supported by the mobile station device is not limited. That is, the mobile station device may support communication in one band only, or the mobile station device may support communication in a plurality of bands.

The parameter (supportedBandListEUTRA) may be transmitted from the mobile station device as a terminal capability information (UECapabilityInformation) message.

The mobile station device transmits a parameter (supportedBandCombination) that includes information indicating a combination of the bands in which carrier aggregation is supported by the mobile station device, to the base station device. Note that the parameter (supportedBandCombination) may include information indicating the bands in which carrier aggregation is not supported by the mobile station device. For each combination of the bands, the mobile station device transmits information, indicating whether or not simultaneous transmission and reception in the plurality of serving cells in the plurality of different bands are supported, to the base station device.

The parameter (supportedBandCombination) may be transmitted from the mobile station device as a terminal capability information (UECapabilityInformation) message.

According to the present embodiment, "X/Y" includes the meaning of "X or Y". According to the present embodiment, "X/Y" includes the meaning of "X and Y". According to the present embodiment, "X/Y" includes the meaning of "X and/or Y".

FIG. 1 is a conceptual diagram of the radio communication system according to the present embodiment. In FIG. 1, the radio communication system includes mobile station devices 1A to 1C and a base station device 3. The mobile station devices 1A to 1C are each hereinafter referred to as a mobile station device 1.

A physical channel and a physical signal according to the present embodiment are described.

In FIG. 1, in uplink radio communication from the mobile station device 1 to the base station device 3, the following uplink physical channels are used. The uplink physical channel is used to transmit information output from a higher layer.

Physical uplink control channel (PUCCH)
Physical uplink shared channel (PUSCH)
Physical random access channel (PRACH)

The PUCCH is a physical channel that is used to transmit uplink control information (UCI). The pieces of uplink control information include downlink channel state information (CSI), a scheduling request (SR) indicating a request for a PUSCH resource, and an acknowledgement (ACK)/negative-acknowledgement (NACK) for downlink data (a transport block or a downlink-shared channel (DL-SCH)). The ACK/NACK is also referred to as an HARQ-ACK, HARQ feedback, or response information.

The PUSCH is a physical channel that is used to transmit uplink data (uplink-shared channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit a random access preamble. A main object of the PRACH is to synchronize the mobile station device 1 to the base station device 3 in terms of a time domain. In addition, the PRACH is also used for the initial connection establishment procedure, the handover procedure, the connection re-establishment procedure, synchronization (timing adjustment) for uplink transmission, and the request for the PUSCH resource.

In FIG. 1, the following uplink physical signal is used for the uplink radio communication. The uplink physical signal is not used to transmit information output from the higher layer, but is used by a physical layer.

Uplink reference signal (UL RS)

According to the present embodiment, the following two types of uplink reference signals are used.

Demodulation reference signal (DMRS)
Sounding reference signal (SRS)

The DMRS relates to transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS has no relationship with the transmission of the PUSCH or the PUCCH. The base station device 3 uses the SRS in order to measure an uplink channel state. The mobile station device 1 transmits a first SRS in a first resource configured by the higher layer. Additionally, upon receiving information indicating a request for transmission of the SRS on the PDCCH, the mobile station device 1 transmits a second SRS only one time in a second resource configured by the higher layer. The first SRS is also referred to as a periodic SRS or a trigger type 0 SRS. The second SRS is also referred to as an aperiodic SRS or a trigger type 1 SRS.

Transmission of the aperiodic SRS is scheduled by the information indicating a request for transmission of the SRS.

In FIG. 1, the following downlink physical channels are used for downlink radio communication from the base station device 3 to the mobile station device 1. The downlink physical channel is used to transmit the information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the mobile station devices 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN.

The PCFICH is used to transmit information indicating a region (OFDM symbols) to be used for transmission of the PDCCH.

The PHICH is used to transmit an HARQ indicator (HARQ feedback or response information) indicating an acknowledgement (ACK) or a negative acknowledgement (NACK) with respect to the uplink data (uplink shared channel (UL-SCH)) received by the base station device 3. For example, in a case where the mobile station device 1 receives the HARQ indicator indicating the ACK, the corresponding uplink data is not re-transmitted. For example, in a case where the mobile station device 1 receives the HARQ indicator indicating the NACK, the corresponding uplink data is re-transmitted. The HARQ indicator for a single piece of uplink data is transmitted on a single PHICH. The base station device 3 transmits HARQ indicators for a plurality of pieces of uplink data included in the same PUSCH, on a plurality of respective PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The downlink grant is used for scheduling of a single PDSCH within a single cell. The downlink grant is used for the scheduling of the PDSCH within the same subframe as the subframe in which the downlink grant is transmitted. The uplink grant is used for scheduling of a single PUSCH within a single cell. The uplink grant is used for scheduling of a single PUSCH within the fourth or later subframe after the subframe in which the uplink grant is transmitted.

Cyclic redundancy check (CRC) parity bits are attached to the DCI format. The CRC parity bits are scrambled with a cell-radio network temporary identifier (C-RNTI) or a semi persistent scheduling cell-radio network temporary identifier (SPS C-RNTI). The C-RNTI and the SPS C-RNTI are identifiers for identifying a mobile station device within a cell.

The C-RNTI is used to control the PDSCH or the PUSCH in a single subframe. The SPS C-RNTI is used to periodically allocate a resource for the PDSCH or the PUSCH.

The PDSCH is used to transmit downlink data (downlink shared channel (DL-SCH)).

The PMCH is used to transmit multicast data (multicast channel (MCH)).

In FIG. 1, in the downlink radio communication, the following downlink physical signals are used. The downlink physical signal is not used to transmit the information output from the higher layer, but is used by the physical layer.

Synchronization signal (SS)
Downlink reference signal (DL RS)

The synchronization signal is used in order for the mobile station device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within the radio frame.

The downlink reference signal is used in order for the mobile station device 1 to perform the channel compensation of the downlink physical channel. The downlink reference signal is used in order for the mobile station device 1 to calculate the downlink channel state information.

According to the present embodiment, the following five types of downlink reference signals are used.

Cell-specific reference signal (CRS)
UE-specific reference signal (URS) relating to the PDSCH
Demodulation reference signal (DMRS) relating to the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in the entire band of a subframe. The CRS is used to perform demodulation of the PBCH/PDCCH/PHICH/PCFICH/PDSCH. The CRS may be used in order for the mobile station device 1 to calculate the downlink channel state information. The PBCH/PDCCH/PHICH/PCFICH is transmitted on an antenna port used for transmission of the CRS.

The URS relating to the PDSCH is transmitted in a subframe and in a band that are used for transmission of the PDSCH to which the URS relates. The URS is used to demodulate the PDSCH to which the URS relates.

The PDSCH is transmitted on an antenna port used for transmission of the CRS or the URS. A DCI format 1A is used to schedule the PDSCH transmitted on the antenna port used for the transmission of the CRS. A DCI format 2D is used to schedule the PDSCH transmitted on the antenna port used for the transmission of the URS.

The DMRS relating to the EPDCCH is transmitted in a subframe and in a band that are used for transmission of the EPDCCH to which the DMRS relates. The DMRS is used to demodulate the EPDCCH to which the DMRS relates. The EPDCCH is transmitted on an antenna port used for transmission of the DMRS.

The NZP CSI-RS is transmitted in a subframe that is configured. A resource in which the NZP CSI-RS is transmitted is configured by the base station device. The NZP CSI-RS is used in order for the mobile station device 1 to calculate the downlink channel state information. The mobile station device 1 performs signal measurement (channel measurement), using the NZP CSI-RS.

A resource for the ZP CSI-RS is configured by the base station device 3. With zero output, the base station device 3 transmits the ZP CSI-RS. To be more precise, the base station device 3 does not transmit the ZP CSI-RS. The base station device 3 transmits neither the PDSCH nor the EPDCCH in a resource configured for the ZP CSI-RS. For example, in a certain cell, the mobile station device 1 can measure interference in a resource to which the NZP CSI-RS corresponds.

The MBSFN RS is transmitted in the entire band of a subframe used for transmission of the PMCH. The MBSFN RS is used to demodulate the PMCH. The PMCH is transmitted on the antenna port used for transmission of the MBSFN RS.

The PRS is used in order for the mobile station device to measure a geographical location of the mobile station device itself.

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a medium access control (MAC) layer is referred to as a transport channel. The unit of the transport channel used in the MAC layer is referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

A configuration of the radio frame according to the present embodiment will be described below.

Figure 2:
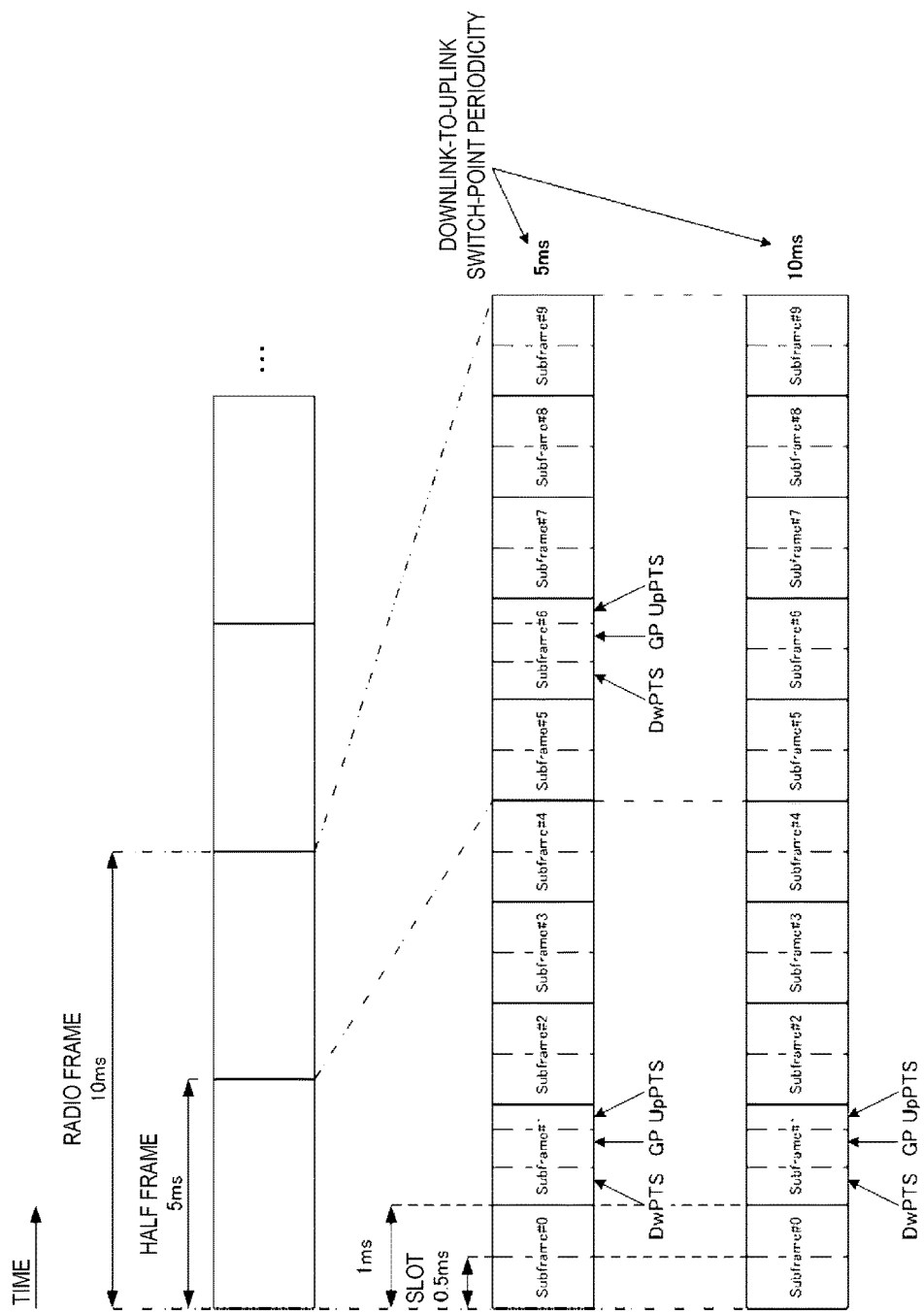
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

According to the present embodiment, the following three types of subframes are defined.

Downlink subframe (a first subframe)
Uplink subframe (a second subframe)
Special subframe (a third subframe)

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the GP, or may be constituted only of the GP and the UpPTS.

A single radio frame is constituted of at least the downlink subframe, the uplink subframe, and the special subframe.

The radio communication system according to the present embodiment supports 5 ms downlink-to-uplink switch-point periodicity and 10 ms downlink-to-uplink switch-point periodicity. In a case where the downlink-to-uplink switch-point periodicity is 5 ms, both of the half frames within the radio frame include the special subframe. In another case where the downlink-to-uplink switch-point periodicity is 10 ms, only the first half frame within the radio frame includes the special subframe.

A configuration of a slot according to the present embodiment will be described below.

Figure 3:
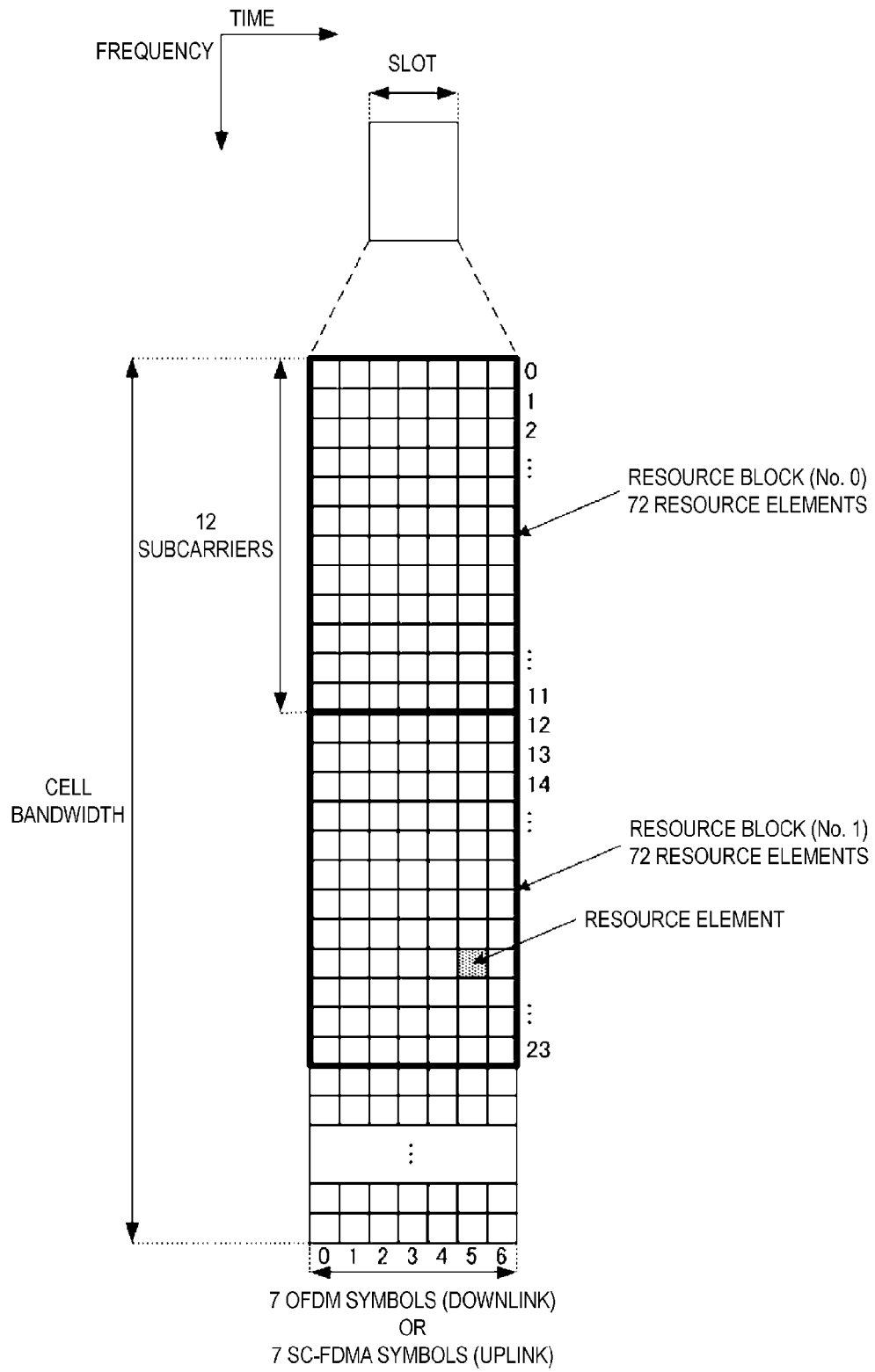
FIG. 3 is a diagram illustrating a configuration of a slot according to the present embodiment.

FIG. 3 is a diagram illustrating the configuration of the slot according to the present embodiment. According to the present embodiment, a normal cyclic prefix (CP) is applied to the OFDM symbol. Moreover, an extended cyclic prefix (CP) may be applied to the OFDM symbol. The physical signal or the physical channel transmitted in each of the slots is expressed by a resource grid. In FIG. 3, the horizontal axis is a time axis, and the vertical axis is a frequency axis. In downlink, the resource grid is defined by a plurality of subcarriers and a plurality of OFDM symbols. In uplink, the resource grid is defined by a plurality of subcarriers and a plurality of SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol or SC-FDMA symbol number.

A resource block is used to express mapping of a certain physical channel (the PDSCH, the PUSCH, or the like) to resource elements. The resource block is defined by a virtual resource block and a physical resource block. A certain physical channel is first allocated to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. The physical resource blocks are numbered from 0 in the frequency domain.

The physical channel and the physical signal that are transmitted in each of the subframes will be described below.

Figure 4:
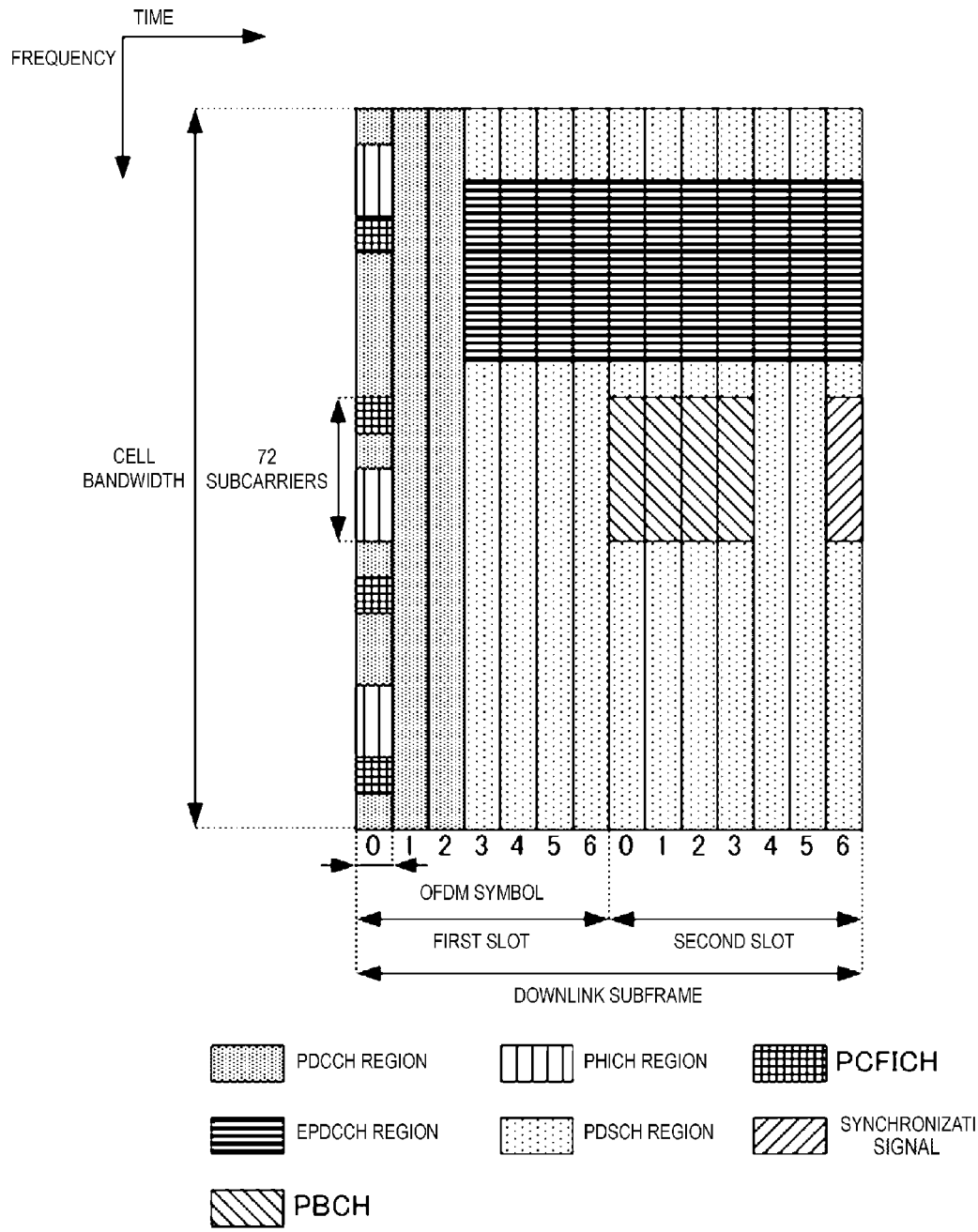
FIG. 4 is a diagram illustrating one example of allocation of a physical channel and mapping of a physical signal to a downlink subframe according to the present embodiment.

FIG. 4 is a diagram illustrating one example of allocation of the physical channel and mapping of the physical signal to the downlink subframe according to the present embodiment. In FIG. 4, the horizontal axis is a time axis, and the vertical axis is a frequency axis. In the downlink subframe, the base station device 3 may transmit the downlink physical channel (the PBCH, the PCFICH, the PHICH, the PDCCH, the EPDCCH, or the PDSCH), and the downlink physical signal (the synchronization signal or the downlink reference signal). Moreover, the PBCH is transmitted only in a subframe 0 within the radio frame. Moreover, the downlink reference signal is mapped to the resource elements distributed in the frequency domain and the time domain. The downlink reference signal is not illustrated in FIG. 4 for the sake of simplicity.

A plurality of PDCCHs may be frequency-multiplexed and time-multiplexed in a PDCCH region. A plurality of EPDCCHs may be frequency-multiplexed, time-multiplexed, and spatial-multiplexed in an EPDCCH region. A plurality of PDSCHs may be frequency-multiplexed and spatial-multiplexed in a PDSCH region. The PDCCH and, the PDSCH or the EPDCCH may be time-multiplexed. The PDSCH and the EPDCCH may be frequency-multiplexed.

Figure 5:
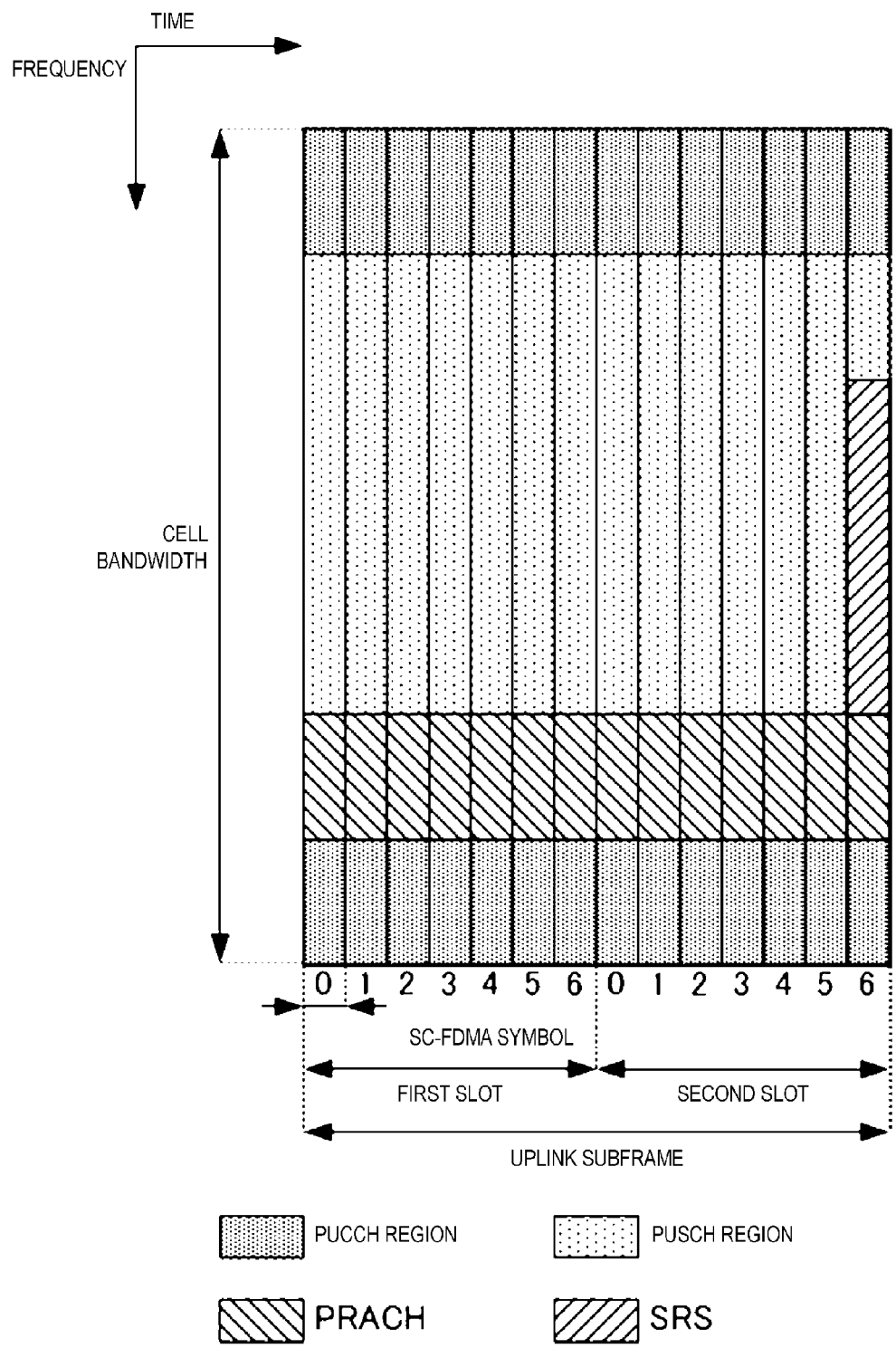
FIG. 5 is a diagram illustrating one example of allocation of a physical channel and mapping of a physical signal to an uplink subframe according to the present embodiment.

FIG. 5 is a diagram illustrating one example of the allocation of the physical channel and the mapping of the physical signal to the uplink subframe according to the present embodiment. In FIG. 5, the horizontal axis is a time axis, and the vertical axis is a frequency axis. In the uplink subframe, the mobile station device 1 may transmit the uplink physical channel (the PUCCH, the PUSCH or the PRACH) and the uplink physical signal (the DMRS or the SRS). A plurality of PUCCHs are frequency-multiplexed, time-multiplexed, and code-multiplexed in a PUCCH region. A plurality of PUSCHs may be frequency-multiplexed and spatial-multiplexed in a PUSCH region. The PUCCH and the PUSCH may be frequency-multiplexed. The PRACH may be allocated over a single subframe or two subframes. Furthermore, a plurality of PRACHs may be code-multiplexed.

The SRS is transmitted using the last SC-FDMA symbol within the uplink subframe. To be more precise, the SRS is mapped to the last SC-FDMA symbol within the uplink subframe. The mobile station device 1 cannot transmit the SRS and the PUCCH/PUSCH/PRACH at the same time in a single SC-FDMA symbol in a single cell. In a single uplink subframe in a single cell, the mobile station device 1 can transmit the PUSCH and/or the PUCCH using the SC-FDMA symbol except for the last SC-FDMA symbol within the uplink subframe, and can transmit the SRS using the last SC-FDMA symbol within the uplink subframe. To be more precise, in the single uplink subframe in the single cell, the mobile station device 1 can transmit both of the SRS and the PUSCH/PUCCH at the same time. Moreover, the DMRS is time-multiplexed together with the PUCCH or the PUSCH. The DMRS is not illustrated in FIG. 5 for the sake of simplicity.

Figure 6:
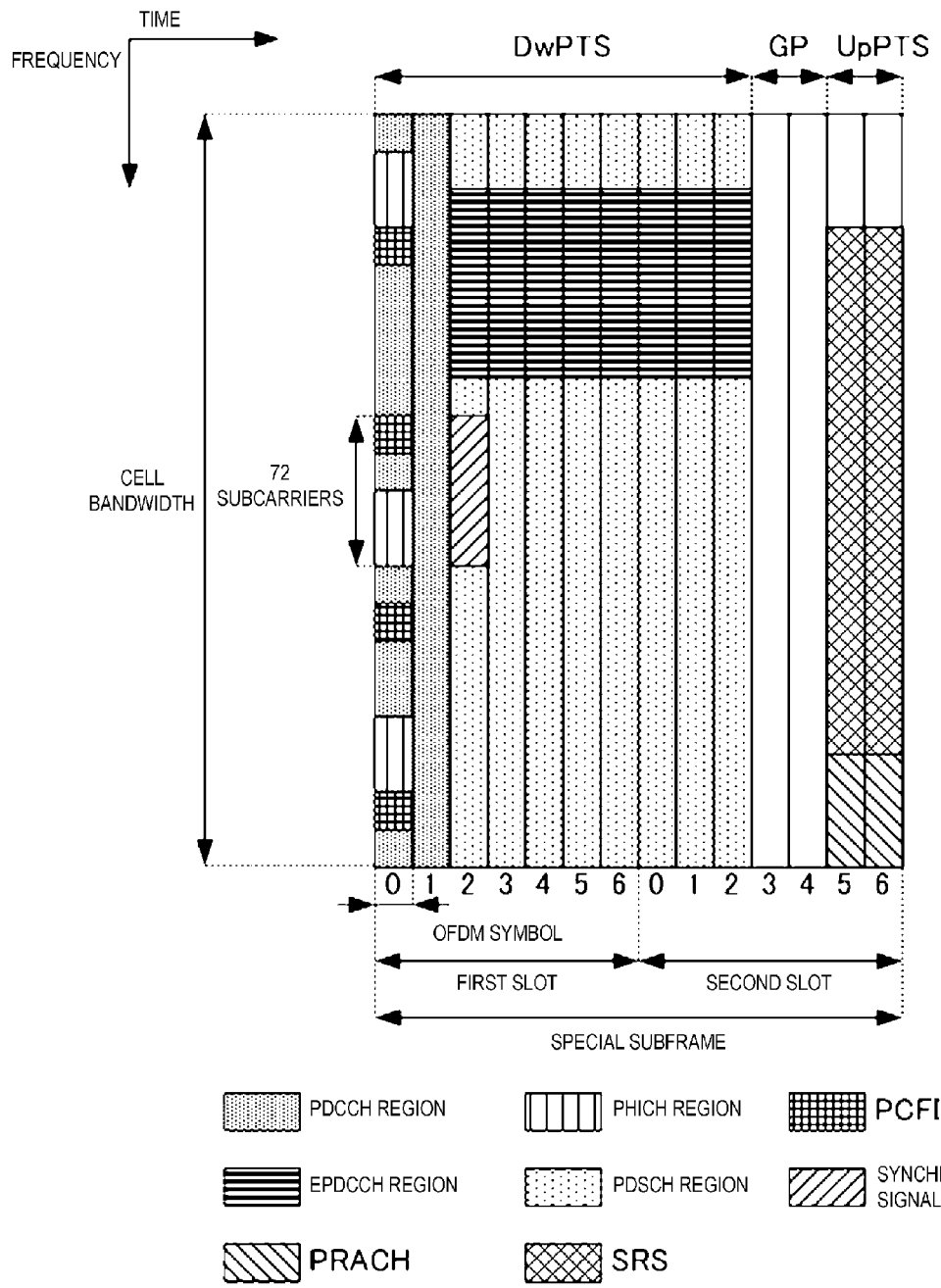
FIG. 6 is a diagram illustrating one example of allocation of a physical channel and mapping of a physical signal to a special subframe according to the present embodiment.

FIG. 6 is a diagram illustrating one example of allocation of the physical channel and mapping of the physical signal to the special subframe according to the present embodiment. In FIG. 6, the horizontal axis is a time axis, and the vertical axis is a frequency axis. In FIG. 6, the DwPTS is constituted of first to 10-th SC-FDMA symbols within the special subframe, the GP is constituted of 11-th and 12-th SC-FDMA symbols within the special subframe, and the UpPTS is constituted of 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, in the DwPTS of the special subframe. The base station device 3 does not transmit the PBCH in the DwPTS of the special subframe. The mobile station device 1 may transmit the PRACH and the SRS in the UpPTS of the special subframe. To be more precise, the mobile station device 1 transmits none of the PUCCH, the PUSCH, and the DMRS in the UpPTS of the special subframe.

Figure 7:
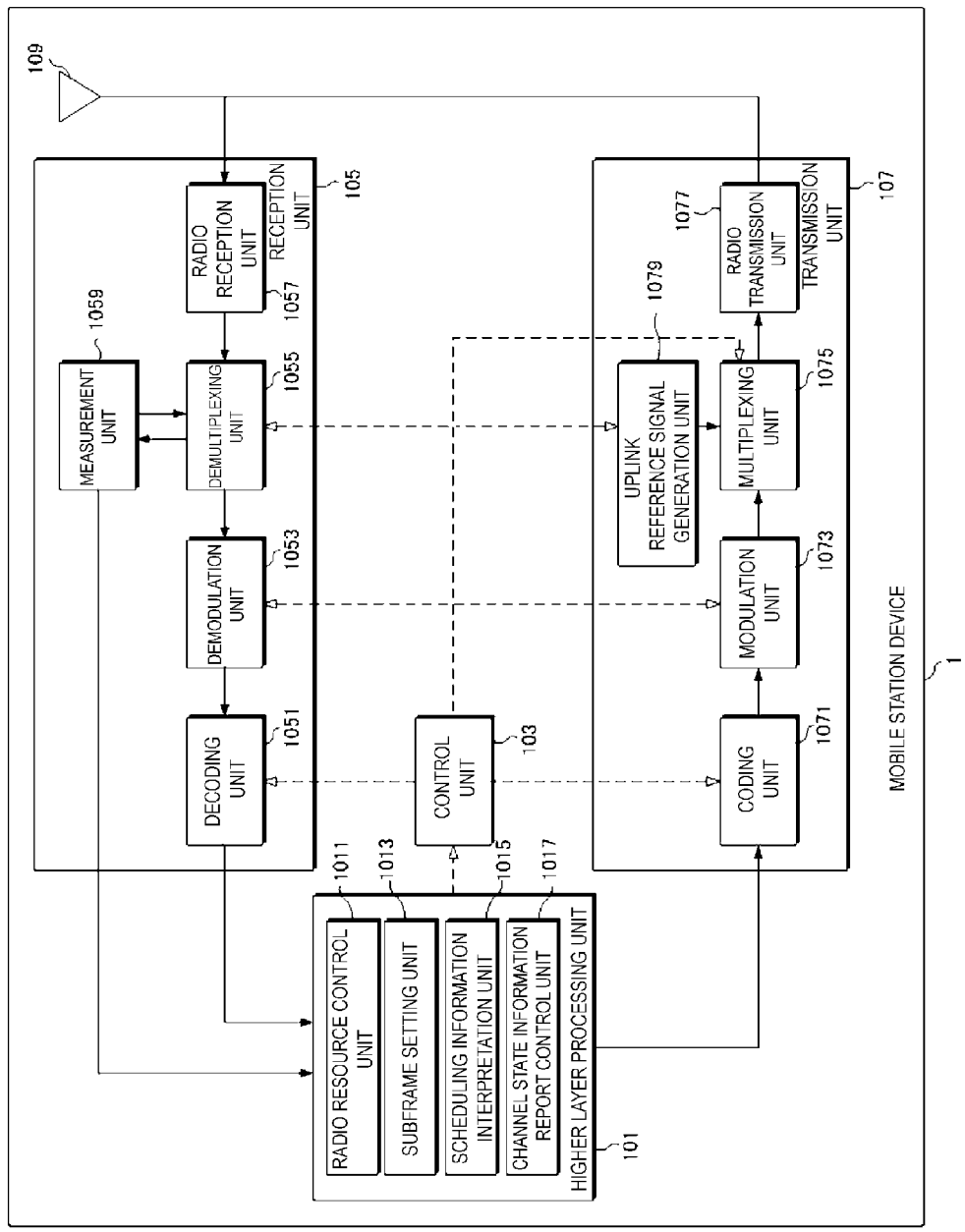
FIG. 7 is a schematic block diagram illustrating a configuration of a mobile station device 1 according to the present embodiment.

FIG. 7 is a schematic block diagram illustrating a configuration of the mobile station device 1 according to the present invention. As illustrated, the mobile station device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a subframe setting unit 1013, a scheduling information interpretation unit 1015, and a channel state information (CSI) report control unit 1017. Furthermore, the reception unit 105 is configured to include a decoding unit 1051, a demodulation unit 1053, a demultiplexing unit 1055, a radio reception unit 1057, and a measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. Furthermore, the higher layer processing unit 101 performs processing of the medium access control (MAC) layer, a packet data convergence protocol (PDCP) layer, a radio link control (RLC) layer, and a radio resource control (RRC) layer.

The radio resource control unit 1011 included in the higher layer processing unit 101 manages various pieces of configuration information of the mobile station device 1 itself. Furthermore, the radio resource control unit 1011 generates information to be arranged in each channel for uplink, and outputs the generated information to the transmission unit 107.

The subframe setting unit 1013 included in the higher layer processing unit 101 manages the uplink-downlink configuration.

The subframe setting unit 1013 sets the uplink-downlink configuration. Furthermore, the subframe setting unit 1013 sets at least two subframe sets.

The scheduling information interpretation unit 1015 included in the higher layer processing unit 101 interprets the DCI format (scheduling information) received through the reception unit 105, generates control information for controlling of the reception unit 105 and the transmission unit 107, on the basis of a result of interpreting the DCI format, and outputs the generated control information to the control unit 103.

The scheduling information interpretation unit 1015 determines the timing at which the transmission processing and the reception processing are performed, on the basis of the uplink-downlink configuration.

A CSI report control unit 1017 specifies a CSI reference resource. The CSI report control unit 1017 instructs the measurement unit 1059 to derive a CQI relating to the CSI reference resource. The CSI report control unit 1017 instructs the transmission unit 107 to transmit the CQI. The CSI report control unit 1017 sets a configuration that is used when the measurement unit 1059 calculates the CQI.

On the basis of the control information originating from the higher layer processing unit 101, the control unit 103 generates a control signal for controlling the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the resulting information to the higher layer processing unit 101.

The radio reception unit 1057 converts (down-converts) a downlink signal received through the transmit and receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a guard interval (GI) from the digital signal resulting from the conversion, performs fast Fourier transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the mobile station device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs, to the higher layer processing unit 101, the downlink data (the transport block) resulting from the decoding.

The measurement unit 1059 measures a downlink path loss or a channel state from the downlink reference signal input from the demultiplexing unit 1055, and outputs the measured path loss or channel state to the higher layer processing unit 101. Furthermore, the measurement unit 1059 calculates a downlink channel estimate from the downlink reference signal and outputs the calculated downlink channel estimate to the demultiplexing unit 1055. The measurement unit 1059 performs channel measurement and/or interference measurement in order to calculate the CQI.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information input from the higher layer processing unit 101 in compliance with a coding scheme, such as convolutional coding or block coding. Furthermore, the coding unit 1071 performs turbo coding on the basis of information used for the scheduling of the PUSCH.

The modulation unit 1073 modulates coded bits input from the coding unit 1071, in compliance with the modulation scheme notified with the downlink control information, such as BPS K, QPSK, 16 QAM, or 64 QAM, or in compliance with a modulation scheme prescribed in advance for each channel. On the basis of the information used for the scheduling of the PUSCH, the modulation unit 1073 determines the number of data sequences to be spatial-multiplexed, maps a plurality of pieces of uplink data to be transmitted on the same PUSCH to a plurality of sequences through multiple input multiple output spatial multiplexing (MIMO SM), and performs precoding on the sequences.

The uplink reference signal generation unit 1079 generates a sequence acquired according to a rule (formula) prescribed in advance, on the basis of a physical cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs discrete Fourier transform (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, performs modulation in compliance with an SC-FDMA scheme, attaches the guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Figure 8:
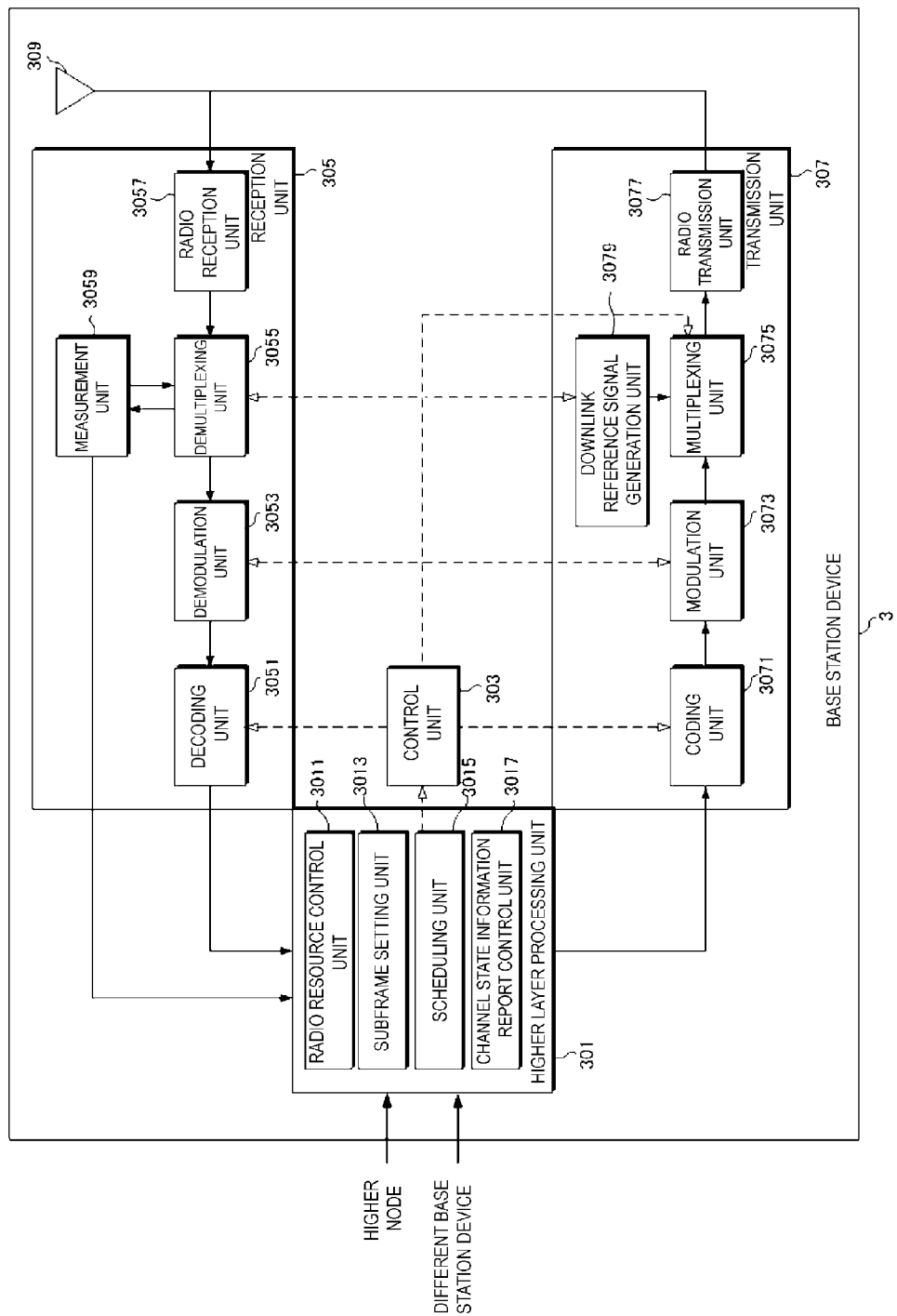
FIG. 8 is a schematic block diagram illustrating a configuration of a base station device 3 according to the present embodiment.

FIG. 8 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a subframe setting unit 3013, a scheduling unit 3015, and a CSI report control unit 3017. Furthermore, the reception unit 305 is configured to include a decoding unit 3051, a demodulation unit 3053, a demultiplexing unit 3055, a radio reception unit 3057, and a measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for controlling the reception unit 305 and the transmission unit 307, and outputs the generated control information to the control unit 303.

The radio resource control unit 3011 included in the higher layer processing unit 301 generates, or acquires from a higher node, the downlink data (the transport block) arranged in the downlink PDSCH, system information, the RRC message, the MAC control element (CE), and the like, and outputs a result of the generation or the acquirement to the transmission unit 307. Furthermore, the radio resource control unit 3011 manages various pieces of configuration information for each of the mobile station devices 1.

The subframe setting unit 3013 included in the higher layer processing unit 301 manages the uplink-downlink configuration for each of the mobile station devices 1.

The subframe setting unit 3013 sets the uplink-downlink configuration for each of the mobile station devices 1.

The subframe setting unit 3013 generates information indicating the uplink-downlink configuration. The subframe setting unit 3013 outputs the information to the mobile station device 1 through the transmission unit 307.

The base station device 3 may determine the uplink-downlink configuration for the mobile station device 1. Additionally, the base station device 3 may receive instruction from a higher node on the uplink-downlink configuration for the mobile station device 1.

For example, the subframe setting unit 3013 may determine the uplink-downlink configuration on the basis of the volume of uplink traffic and the volume of downlink traffic.

The subframe setting unit 3013 performs management of at least two subframe sets. The subframe setting unit 3013 may set at least two subframe sets for each of the mobile station devices 1. The subframe setting unit 3013 may set at least two subframe sets for each of the serving cells. The subframe setting unit 3013 may set at least two subframe sets for each CSI process.

The subframe setting unit 3013 transmits information indicating at least two subframe sets to the mobile station device 1 through the transmission unit 307.

The scheduling unit 3015 included in the higher layer processing unit 301 determines a frequency and a subframe to which the physical channels (the PDSCH and the PUSCH) are allocated, the coding rate and modulation scheme for the physical channels (the PDSCH and the PUSCH), the transmission power, and the like, from the received channel state information and from the channel estimate, channel quality, or the like input from the measurement unit 3059. The scheduling unit 3015 determines whether, in a flexible subframe, the downlink physical channel and/or the downlink physical signal is scheduled or the uplink physical channel and/or the uplink physical signal is scheduled. The scheduling unit 3015 generates the control information (for example, the DCI format) in order to control the reception unit 305 and the transmission unit 307 on the basis of a result of the scheduling, and outputs the generated information to the control unit 303.

The scheduling unit 3015 generates the information to be used for the scheduling of the physical channels (the PDSCH and the PUSCH), on the basis of the result of the scheduling. The scheduling unit 3015 additionally determines the timing at which the transmission processing and the reception processing are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI report control unit 3017 included in the higher layer processing unit 301 controls a CSI report that is made by the mobile station device 1. The CSI report control unit 3017 transmits information that is assumed in order for the mobile station device 1 to derive a CQI in the CSI reference resource and that shows various configurations, to the mobile station device 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the mobile station device 1 through the transmit and receive antenna 309, and outputs information resulting from the decoding to the higher layer processing unit 301. The radio reception unit 3057 converts (down-converts) an uplink signal received through the transmit and receive antenna 309 into a signal of an intermediate frequency, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal.

The radio reception unit 3057 removes a portion corresponding to the guard interval (GI) from the digital signal resulting from the conversion. The radio reception unit 3057 performs fast Fourier transform (FFT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Moreover, the demultiplexing is performed on the basis of radio resource allocation information that is determined in advance by the base station device 3 using the radio resource control unit 3011 and that is included in the uplink grant notified to each of the mobile station devices 1. Furthermore, the demultiplexing unit 3055 makes a compensation of channels including the PUCCH and the PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies in advance with the uplink grant to each of the mobile station devices 1. The demodulation unit 3053 demultiplexes the modulation symbols of the plurality of pieces of uplink data transmitted on the same PUSCH by using the MIMO SM, on the basis of the number of spatial-multiplexed sequences notified in advance with the uplink grant to each of the mobile station devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the mobile station device 1 by the base station device 3 itself, and outputs, to the higher layer processing unit 101, the decoded uplink data and uplink control information. In a case where the PUSCH is re-transmitted, the decoding unit 3051 performs the decoding using the coded bits input from the higher layer processing unit 301 and retained in an HARQ buffer, and the demodulated coded bits. The measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the mobile station device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the mobile station device 1 and that is acquired according to a rule prescribed in advance on the basis of the physical cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal to the resource elements.

The radio transmission unit 3077 performs inverse fast Fourier transform (IFFT) on the modulation symbol resulting from the multiplexing or the like, performs the modulation in compliance with an OFDM scheme to generate an OFDM symbol, attaches the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and receive antenna 309 for transmission.

The uplink-downlink configuration will be described below.

FIG. 9 illustrates one example of the uplink-downlink configuration according to the present embodiment. In FIG. 9, D denotes a downlink subframe, U denotes an uplink subframe, and S denotes a special subframe.

In cases of uplink-downlink configurations 0 to 6 of FIG. 9, a subframe 1 within the radio frame is always a special subframe. In the cases of uplink-downlink configurations 0 to 6 of FIG. 9, subframes 0 and 5 are always reserved for the downlink transmission, and a subframe 2 is always reserved for the uplink transmission.

In the cases of uplink-downlink configurations 0 to 6 of FIG. 9, in a case where a downlink-uplink switch-point periodicity is 5 ms, a subframe 6 within the radio frame is a special subframe. In another case where the downlink-uplink switch-point periodicity is 10 ms, the subframe 6 within the radio frame is a downlink subframe.

In a cases of uplink-downlink configuration 7 of FIG. 9, all of the subframes within the radio frame are downlink subframes. That is, in the case of uplink-downlink configuration 7 of FIG. 9, all of the subframes within the radio frame are reserved for the downlink transmission. Specifically, the subframe 1 within the radio frame is not a special subframe. Additionally, in the case of the uplink-downlink configuration 7 of FIG. 9, the subframes 0 and 5 are not reserved for the downlink transmission, and the subframe 2 is not reserved for the uplink transmission.

In the case of uplink-downlink configuration 7 of FIG. 9, the downlink-uplink switch-point periodicity does not exist.

A method of setting the uplink-downlink configuration will be described below.

The base station device 3 sets the uplink-downlink configuration. The base station device 3 may transmit the information indicating the uplink-downlink configuration (TDD-Config) in at least one of an MIB, a system information block type 1 message, a system information message, an RRC message, a MAC control element (CE), and physical layer control information (for example, a DCI format). Furthermore, the base station device 3 may include the information indicating the uplink-downlink configuration (TDD-Config) in any one of the MIB, the system information block type 1 message, the system information message, the RRC message, the MAC control element (CE), and the physical layer control information (for example, the DCI format), depending on the situation.

The uplink-downlink configuration may be defined for each of the plurality of serving cells.

The base station device 3 transmits, to the mobile station device 1 for which a plurality of serving cells are configured, the information indicating the uplink-downlink configuration (TDD-Config) for each of the serving cells. Note that the information indicating the uplink-downlink configuration (TDD-Config) may be defined for each of the serving cells.

The base station device 3 may transmit, to a mobile station device 1 for which serving cells constituted of one primary cell and at least one secondary cell are configured, information indicating the uplink-downlink configuration (TDD-Config) for the primary cell and information indicating the uplink-downlink configuration (TDD-Config) for the secondary cell(s). Note that information indicating one uplink-downlink configuration (TDD-Config) for a plurality of secondary cells may be transmitted. That is, a common uplink-downlink configuration may be configured for a plurality of the secondary cells.

The mobile station device 1 for which a plurality of serving cells are configured may set the uplink-downlink configuration, on the basis of the information indicating the uplink-downlink configuration (TDD-Config), for each of the serving cells.

The mobile station device 1, for which the serving cells constituted of one primary cell and at least one secondary cell are configured, may set the uplink-downlink configuration for the primary cell and the uplink-downlink configuration for the secondary cell(s). Note that the mobile station device 1 may configure a common uplink-downlink configuration for a plurality of the secondary cells.

The information indicating the uplink-downlink configuration (TDD-Config) for the primary cell is preferably included in the system information block type 1 message, the system information message, the RRC message, or the physical layer control information (for example, the DCI format). The information indicating the uplink-downlink configuration (TDD-Config) for the secondary cell is preferably included in the system information block type 1 message, the system information message, the RRC message, or the physical layer control information (for example, the DCI format).

The information indicating the uplink-downlink configuration (TDD-Config) may be common to the plurality of mobile station devices 1 within the cell or may be dedicated to each of the mobile station devices 1 within the cell.

The uplink-downlink configuration 7 can be configured only for the secondary cell(s). That is, any one of the uplink-downlink configurations 0 to 6 may be configured for the primary cell and any one of the uplink-downlink configurations 0 to 7 may be configured for the secondary cell(s).

Additionally, in a case where dual-connectivity is enabled, the uplink-downlink configuration 7 can also be configured for a primary secondary cell (pSCell). Details of the primary secondary cell will be discussed later. That is, any one of the uplink-downlink configurations 0 to 7 may be configured for the primary secondary cell.

The system information block type 1 message is initially transmitted on PDSCH in a subframe 5 within a radio frame satisfying SFN mod 8=0, and is re-transmitted (repetition) in a subframe 5 within a different radio frame satisfying SFN mod 2=0. The system information block type 1 message includes information indicating a configuration (the lengths of the DwPTS, the GP, and the UpPTS) of a special subframe. The system information block type 1 message is cell-specific information.

The system information message is transmitted on the PDSCH. The system information message is cell-specific information. The system information message includes a system information block X other than the system information block type 1.

The RRC message is transmitted on the PDSCH. The RRC message is information or a signal that is processed in an RRC layer. The RRC message may be common to the plurality of mobile station devices 1 within a cell or may be dedicated to a specific mobile station device 1.

The MAC CE is transmitted on the PDSCH. The MAC CE is information or a signal that is processed in a MAC layer.

A description of a method for notifying the base station device 3 of the capability (features) of the mobile station device 1 is given below. The mobile station device 1 notifies the base station device 3 of the capability of the mobile station device 1 through higher layer (RRC) signalling.

The base station device 3 transmits a terminal capability enquiry (UECapabilityEnquiry) message to the mobile station device 1. The terminal capability enquiry message is used for requesting transmission of the radio access capability of the mobile station device 1. The mobile station device 1 transmits a terminal capability information (UECapabilityInformation) message to the base station device 3 in response to the terminal capability enquiry message. The terminal capability information message is used for transmitting the radio access capability of the mobile station device 1 that has been requested by the base station device 3. The terminal capability information message includes a terminal capability (UE-EUTRA-Capability) information element. The UE-EUTRA-Capability is used to convey, to the network, the radio access capability parameter of the mobile station device 1 at the base station device 3 and the feature group indicator (FGI) for mandatory features.

The UE-EUTRA-Capability includes at least parameters related to the radio frequency (RF-Parameters) and parameters related to the physical layer (PhyLayerParameters). The RF-Parameters includes at least a list of the bands supported by the mobile station device 1 (supportedBandListEUTRA) and/or a combination of the bands supported by the mobile station device 1 (supportedBandCombination). The supportedBandListEUTRA is a list of the bands (SupportedBandEUTRA) supported by the mobile station device 1. The supportedBandCombination is a list of parameters (BandCombinationParameters) related to the combination of the bands supported by the mobile station device 1.

The SupportedBandEUTRA includes at least an indicator (FreqBandIndicator) indicating the band supported by the mobile station device 1 and information (halfDulplex) indicating if half-duplex communication or full-duplex communication is supported in the band. Note that the number of bands in which communication is supported by the mobile station device 1 not limited. That is, the mobile station device 1 may support communication in only one band, or the mobile station device 1 may support communication in a plurality of bands.

The BandCombinationParamaters includes parameters (BandParameters) related to each band in the combination of the bands supported by the mobile station device 1. The BandParameters includes an indicator (FreqBandIndicator) indicating the band, parameters (BandParametersUL) related to the uplink in the band, and parameters (BandParametersDL) related to the downlink in the band. The BandParametersUL is a list of the parameters (CA-MIMO-ParametersUL) related to CA and MIMO in the uplink. The BandParametersDL is a list of the parameters (CA-MIMO-ParametersDL) related to CA and MIMO in the downlink. The CA-MIMO-ParametersUL includes information (CA-BandwidthClass) indicating the CA bandwidth class in the uplink, and information (MIMO-CapabilityUL) related to the number of MIMO layers supported in the uplink. The CA-MIMO-ParametersDL includes information (CA-BandwidthClass) indicating the CA bandwidth class in the downlink, and information (MIMO-CapabilityDL) related to the number of MIMO layers supported in the downlink. The mobile station device 1 explicitly includes all the supported CA bandwidth classes in the signalling related to the band combination in the CA-BandwidthClass.

Hereinafter, for the sake of description, information related to the support of features (capability) for the uplink-downlink configurations 0 to 7 (information indicating whether or not features related to all the uplink-downlink configurations including the supplemental uplink-downlink configuration 7 are supported) is referred to as "first information related to feature support for uplink-downlink configuration"; and information related to the support of features (capability) for the uplink-downlink configuration 7 (information indicating whether or not features related to the supplemental uplink-downlink configuration 7 are supported) is referred to as "second information related to feature support for uplink-downlink configuration". Note that the second information related to feature support for uplink-downlink configuration may be information related to the support of features (capability) for only the uplink-downlink configuration 7, that is, information indicating that the features (capability) for the uplink-downlink configurations 0 to 6 are not supported.

The mobile station device 1 may retain (configure) the first information related to feature support for uplink-downlink configuration for each band in which communication is supported by the mobile station device 1 (each band for which the mobile station device 1 has communication capability). That is, whether or not the features related to all of the uplink-downlink configurations including the supplemental uplink-downlink configuration 7 are supported may be preset for each of the bands in which communication is supported by the mobile station device 1.

The mobile station device 1 may retain (configure) the second information related to feature support for uplink-downlink configuration for each band in which communication is supported by the mobile station device 1 (each band for which the mobile station device 1 has communication capability). That is, whether or not the features related to the supplemental uplink-downlink configuration 7 are supported may be preset for each of the bands in which communication is supported by the mobile station device 1.

The band(s) supported by the mobile station device 1 is(are) preferably the band(s) indicated by the parameter (supportedBandListEUTRA) that includes the information indicating the list of the bands supported by the mobile station device 1. Note that the parameter (supportedBandListEUTRA) may be transmitted from the mobile station device 1 as a terminal capability information (UECapabilityInformation) message.

The mobile station device 1 may retain (configure) the first information related to feature support for uplink-downlink configuration for each of the bands corresponding to the band combination in which carrier aggregation is supported by the mobile station device 1 (each of the bands corresponding to the band combination for which the mobile station device 1 has carrier aggregation features). That is, whether or not the features related to all of the uplink-downlink configurations, including the supplemental uplink-downlink configuration 7, are supported may be preset for each of the bands corresponding to the band combination in which carrier aggregation is supported by the mobile station device 1.

The mobile station device 1 may retain (configure) the second information related to feature support for uplink-downlink configuration for each of the bands corresponding to the band combination in which carrier aggregation is supported by the mobile station device 1 (each of the bands corresponding to the band combination for which the mobile station device 1 has carrier aggregation features). That is, whether or not the features related to the supplemental uplink-downlink configuration 7 are supported may be preset for each of the bands corresponding to the band combination in which carrier aggregation is supported by the mobile station device 1.

The mobile station device 1 may retain (configure) the first information related to feature support for uplink-downlink configuration for each combination of the bands in which carrier aggregation is supported by the mobile station device 1 (each combination of the bands for which the mobile station device 1 has carrier aggregation features). That is, whether or not the features related to all of the uplink-downlink configurations, including the supplemental uplink-downlink configuration 7, are supported may be preset for each combination of the bands in which carrier aggregation is supported by the mobile station device 1.

The mobile station device 1 may retain (configure) the second information related to feature support for uplink-downlink configuration for each combination of the bands in which carrier aggregation is supported by the mobile station device 1 (each combination of the bands for which the mobile station device 1 has carrier aggregation features). That is, whether or not the features related to the supplemental uplink-downlink configuration 7 are supported may be preset for each combination of the bands in which carrier aggregation is supported by the mobile station device 1.

The combination of the bands in which carrier aggregation is supported by the mobile station device 1 are preferably the combination of the bands indicated by the parameter (supportedBandCombination) that includes the information indicating the combination of the bands in which carrier aggregation is supported by the mobile station device 1. Note that the parameter (supportedBandCombination) may be transmitted from the mobile station device 1 as a terminal capability information (UECapabilityInformation) message.

Here, the mobile station device 1 may transmit the first information related to feature support for uplink-downlink configuration and/or the second information related to feature support for uplink-downlink configuration to the base station device 3. In a case of transmission of the second information related to feature support for uplink-downlink configuration, information related to the support of features (capability) for only the uplink-downlink configurations 0 to 6 (third information related to feature support for uplink-downlink configuration) may be transmitted. The first information related to feature support for uplink-downlink configuration and/or the second information related to feature support for uplink-downlink configuration may be transmitted as a terminal capability information (UECapabilityInformation) message or as a feature group indicator (FGI). For example, the first information related to feature support for uplink-downlink configuration and/or the second information related to feature support for uplink-downlink configuration may be included in a higher layer signal (e.g. an RRC message) as a terminal capability information (UECapabilityInformation) message or as an FGI, and transmitted.

The first information related to feature support for uplink-downlink configuration and/or the second information related to feature support for uplink-downlink configuration may be transmitted only for cases in which the mobile station device 1 supports the features corresponding to the information. That is, in cases where the mobile station device 1 does not support the features corresponding to the information, the first information related to feature support for uplink-downlink configuration and/or the second information related to feature support for uplink-downlink configuration may not be transmitted.

With the first information related to feature support for uplink-downlink configuration and/or the second information related to feature support for uplink-downlink configuration, a "1" may be transmitted when the mobile station device 1 supports the features corresponding to the information and a "0" may be transmitted when the mobile station device 1 does not support the features corresponding to the information.

With the first information related to feature support for uplink-downlink configuration and/or the second information related to feature support for uplink-downlink configuration, "True" may be transmitted when the mobile station device 1 supports the features corresponding to the information and "False" may be transmitted when the mobile station device 1 does not support the features corresponding to the information.

Here, for example, the terminal capability information (UECapabilityInformation) message may be a parameter indicating whether or not optional features have been implemented and successfully tested. Additionally, the terminal capability information (UECapabilityInformation) message may be a parameter indicating whether or not mandatory features with the parameters have been successfully tested. Additionally, the FGI may be a specific indicator of a case where all of the features for a feature group recorded in a prescribed table have been implemented and successfully tested.

For example, the first information related to feature support for uplink-downlink configuration and/or the second information related to feature support for uplink-downlink configuration may be included in the parameters related to the physical layer (PhyLayerParameters). That is, regardless of the band(s) in which the terminal device 1 supports communication, the mobile station device 1 may make a notification of whether or not the mobile station device 1 supports the features (capability) related to the uplink-downlink configurations 0 to 7 and/or whether or not the mobile station device 1 supports the features (capability) related to the uplink-downlink configuration 7.

For example, the first information related to feature support for uplink-downlink configuration and/or the second information related to feature support for uplink-downlink configuration may be included in the parameter related to the radio frequency (RF-Parameters). That is, for each of the bands in which the terminal device 1 supports communication, the mobile station device 1 may make a notification of whether or not the mobile station device 1 supports the features (capability) related to the uplink-downlink configurations 0 to 7 and/or whether or not the mobile station device 1 supports the features (capability) related to the uplink-downlink configuration 7.

For example, the first information related to feature support for uplink-downlink configuration and/or the second information related to feature support for uplink-downlink configuration may be included in the list (supportedBandListEUTRA) of the bands (supportedBandEUTRA) supported by the mobile station device 1. Note that the first information related to feature support for uplink-downlink configuration and/or the second information related to feature support for uplink-downlink configuration may be retained (configure) for each band corresponding to the indicator (FreqBandIndicator) indicating the band supported by the mobile station device 1, which is included in the SupportedBandEUTRA, and may be transmitted from the mobile station device 1 as a terminal capability information (UECapabilityInformation) message.

For example, the first information related to feature support for uplink-downlink configuration and/or the second information related to feature support for uplink-downlink configuration may be included in the list (supportedBandCombination) of the parameters (BandCombinationParameters) related to the combination of the bands supported by the mobile station device 1. Note that the first information related to feature support for uplink-downlink configuration and/or the second information related to feature support for uplink-downlink configuration may be retained (configure) for each band corresponding to the band indicator (FreqBandIndicator) included in the parameters (BandParameters) related to each band in the combination of the band supported by the mobile station device 1, which are included in the BandCombinationParameter, and may be transmitted from the mobile station device 1 as a terminal capability information (UECapabilityInformation) message.

For example, the first information related to feature support for uplink-downlink configuration and/or the second information related to feature support for uplink-downlink configuration may be included in the list (BandParametersUL) of the parameters (CA-MIMO-ParametersUL) related to CA and MIMO in the uplink of the band included in the BandParameters. Note that the first information related to feature support for uplink-downlink configuration and/or the second information related to feature support for uplink-downlink configuration may be included in the information (CA-BandwidthClass) that indicates the CA bandwidth class in the uplink and is included in the CA-MIMO-ParametersUL, or may be included in the information (MIMO-CapabilityUL) that is related to the number of MIMO layers supported in the uplink and is included in the CA-MIMO-ParametersUL.

For example, the first information related to feature support for uplink-downlink configuration and/or the second information related to feature support for uplink-downlink configuration may be included in the list (BandParametersDL) of the parameters (CA-MIMO-ParametersDL) related to CA and MIMO in the downlink of the band that is included in the BandParameters. Note that the first information related to feature support for uplink-downlink configuration and/or the second information related to feature support for uplink-downlink configuration may be included in the information indicating the CA bandwidth class (CA-BandwidthClass) in the downlink included in the CA-MIMO-ParametersDL, or may be included in the information (MIMO-CapabilityDL) that is related to the number of MIMO layers supported in the downlink and is included in the CA-MIMO-ParametersDL.

For example, in cases where the first information related to feature support for uplink-downlink configuration and/or the second information related to feature support for uplink-downlink configuration is included in the PhyLayerParameters (the mobile station device 1 supports features corresponding to this information), and where the band, corresponding to the band indicator (FreqBandIndicator) included in the BandParameters included in the BandCombinationParameters, is a TDD band, the features corresponding to the first information related to feature support for uplink-downlink configuration and/or the second information related to feature support for uplink-downlink configuration may be supported in the TDD band.

For example, in cases where the first information related to feature support for uplink-downlink configuration and/or the second information related to feature support for uplink-downlink configuration is included in the PhyLayerParameters (the mobile station device 1 supports features corresponding to this information), and where the band, corresponding to the band indicator (FreqBandIndicator) included in the BandParameters included in the BandCombinationParameters, is a TDD band and a parameter (dl-only) included in the BandParameters of the TDD band is "1" or "True", the features corresponding to the first information related to feature support for uplink-downlink configuration and/or the second information related to feature support for uplink-downlink configuration may be supported in the TDD band.

For example, in cases where the first information related to feature support for uplink-downlink configuration and/or the second information related to feature support for uplink-downlink configuration is included in the PhyLayerParameters (the mobile station device 1 supports features corresponding to this information), and where the band, corresponding to the band indicator (FreqBandIndicator) included in the BandParameters included in the BandCombinationParameters, is a TDD band and the parameter (dl-only) included in the BandParameters of the TDD band is "0" or "False", only the features related to the uplink-downlink configurations 0 to 6 may be supported in the TDD band (the features corresponding to the first information related to feature support for uplink-downlink configuration and/or the second information related to feature support for uplink-downlink configuration may not be supported).

For example, in cases where the first information related to feature support for uplink-downlink configuration and/or the second information related to feature support for uplink-downlink configuration is not included in the PhyLayerParameters (the mobile station device 1 does not support features corresponding to this information), and where the band, corresponding to the band indicator (FreqBandIndicator) included in the BandParameters included in the BandCombinationParameters, is a TDD band, only the features related to the uplink-downlink configurations 0 to 6 may be supported in the TDD band (the features corresponding to the first information related to feature support for uplink-downlink configuration and/or the second information related to feature support for uplink-downlink configuration may not be supported).

A description of an unlicensed band is given below.

A licensed band is a band for which a license is granted by a government or a frequency administrator and which is used in the telecommunication business. An unlicensed band is a band used by specific low-power radio stations such as wireless LAN, for which a license is not required. For example, the unlicensed band may include 2.4 GHz and/or 5 GHz (5150 to 5350 MHz, 5470 to 5725 MHz, 5725 to 5850 MHz) band.

For example, a configuration in which LTE-based communication is enabled in an unlicensed band and cell aggregation is employed in a licensed band cell and an unlicensed band cell achieves efficient communication.

For the cell aggregation in the licensed band cell and the unlicensed band cell, it is preferable that the licensed band cell be configured as the primary cell and the unlicensed band cell be configured as the secondary cell.

It is preferable that the licensed band cell be used for communication of control data and user data, and the unlicensed band cell be used for communication of user data. Note that it is preferable that only radio resources used in downlink communication exist in the unlicensed band cell or, in other words, it is preferable that radio resources used in uplink communication do not exist in the unlicensed band cell. That is, it is preferable that the unlicensed band cell be used only for the downlink transmission of user data.

It is preferable that an FDD scheme or a TDD scheme using the uplink-downlink configurations 0 to 6 be applied to the licensed band cell.

It is preferable that an FDD scheme in which only radio resources (downlink carriers) used in downlink communication exist, or a TDD scheme using the uplink-downlink configuration 7 be applied to the unlicensed band cell.

It is preferable that the base station device 3 include collision avoidance means for avoiding collision between communication in the unlicensed band cell and communication in another radio communication system that uses the same frequency. For example, it is preferable that the base station device has carrier sensing, or listen before talk (LBT), features. The base station device with such features checks the usage state of the frequency (channel) intended for transmission before initiating communication in the unlicensed band cell, and, if the channel is busy, attempts to initiate communication again after a certain period of time passes in order to avoid transmitting multiple carriers on the same frequency.

The bands available for communication between the base station device 3 and the mobile station device 1 (E-UTRA operating bands) may be managed with a table shared by the base station device 3 and the mobile station device 1. For example, the bands available for communication (E-UTRA operating bands) may be indexed for management, and a band corresponding to a prescribed index may be the licensed band, and a band corresponding to a prescribed index may be the unlicensed band. Note that the indexes of the bands available for communication (E-UTRA operating bands) may be transmitted from the mobile station device 1 as a terminal capability information (UECapabilityInformation) message in which the indexes of the bands are represented as FreqBandIndicator. In the indexes of the bands available for communication (E-UTRA operating bands), it is preferable that the uplink operating bands, the downlink operating bands, and the duplex mode (FDD scheme or TDD scheme) be associated with each other.

In cases where the mobile station device 1 supports the features (capability) for communication in the unlicensed band, the mobile station device 1 may notify the base station device 3 of whether or not the features for communication in the unlicensed band are supported. That is, information related to the support of features for communication in the unlicensed band may be transmitted from the mobile station device 1 as a terminal capability information (UECapabilityInformation) message. For example, the information related to the support of features for communication in the unlicensed band may be included in the parameter related to the physical layer (PhyLayerParameters).

That is, in cases where the mobile station device 1 supports the features for communication in the unlicensed band, the information related to the support of features for communication in the unlicensed band may be retained (configured) for each band and be transmitted from the mobile station device 1 as a terminal capability information (UECapabilityInformation) message. For example, the information related to the support of features for communication in the unlicensed band may be included in the parameter related to the radio frequency (RF-Parameters).

For example, the information related to the support of features for communication in the unlicensed band may be included in the list (supportedBandListEUTRA) of the bands (SupportedBandEUTRA) supported by the mobile station device 1. Note that the information related to the support of features for communication in the unlicensed band may be retained (configured) for each band corresponding to the indicator (FreqBandIndicator) indicating the band supported by the mobile station device 1, which is included in the SupportedBandEUTRA, and may be transmitted from the mobile station device 1 as a terminal capability information (UECapabilityInformation) message.

For example, the information related to the support of features for communication in the unlicensed band may be included in the list (supportedBandCombination) of the parameters related to the band combination (BandCombinationParameters) supported by the mobile station device 1. Note that the information related to the support of features for communication in the unlicensed band may be retained (configured) for each band corresponding to the band indicator (FreqBandIndicator) included in the parameter (BandParameters) related to each band in the band combination supported by the mobile station device 1, which is included in the BandCombinationParameters, and may be transmitted from the mobile station device 1 as a terminal capability information (UECapabilityInformation) message.

For example, the information related to the support of features for communication in the unlicensed band may be included in the list (BandParametersUL) of the parameters (CA-MIMO-ParametersUL) related to CA and MIMO in the uplink of the band included in the BandParameters. Note that, the information related to the support of features for communication in the unlicensed band may be included in the information indicating the CA bandwidth class (CA-BandwidthClass) in the uplink included in the CA-MIMO-ParametersUL, or may be included in the information (MIMO-CapabilityUL) related to the number of MIMO layers supported in the uplink included in the CA-MIMO-ParametersUL.

For example, the information related to the support of features for communication in the unlicensed band may be included in the list (BandParametersDL) of the parameters (CA-MIMO-ParametersDL) related to CA and MIMO in the downlink of the band included in the BandParameters. Note that, the information related to the support of features for communication in the unlicensed band may be included in the information (CA-BandwidthClass) indicating the CA bandwidth class in the downlink included in the CA-MIMO-ParametersDL, or may be included in the information (MIMO-CapabilityDL) that is related to the number of MIMO layers supported in the downlink and is included in the CA-MIMO-ParametersDL.

For example, in cases where the information related to the support of features for communication in the unlicensed band is included in the PhyLayerParameters (the mobile station device 1 supports the features related to communication in the unlicensed band), and where the band, corresponding to the band indicator (FreqBandIndicator) included in the BandParameters included in the BandCombinationParameters, is a TDD band, the features for communication in the unlicensed band may be supported in the TDD band.

For example, in cases where the information related to the support of features for communication in the unlicensed band is included in the PhyLayerParameters (the mobile station device 1 supports the features related to communication in the unlicensed band), and where the band, corresponding to the band indicator (FreqBandIndicator) included in the BandParameters included in the BandCombinationParameters, is a TDD band and the parameter (dl-only) included in the BandParameters of the TDD band is "1" or "True", the features for communication in the unlicensed band may be supported in the TDD band.

For example, in cases where the information related to the support of features for communication in the unlicensed band is included in the PhyLayerParameters (the mobile station device 1 supports the features related to communication in the unlicensed band), and where the band, corresponding to the band indicator (FreqBandIndicator) included in the BandParameters included in the BandCombinationParameters, is a TDD band and the parameter (dl-only) included in the BandParameters of the TDD band is "0" or "False", the features for communication in the unlicensed band may not be supported in the TDD band (only the features for communication in the licensed band may be supported in the TDD band).

For example, in cases where the information related to the support of features for communication in the unlicensed band is not included in the PhyLayerParameters (the mobile station device 1 does not support the features related to communication in the unlicensed band), and where the band, corresponding to the band indicator (FreqBandIndicator) included in the BandParameters included in the BandCombinationParameters, is a TDD band, the features for communication in the unlicensed band may not be supported in the TDD band (only the features for communication in the licensed band may be supported in the TDD band).

In cases where the mobile station device 1 supports the features for communication in the unlicensed band, the first information related to feature support for uplink-downlink configuration and/or the second information related to feature support for uplink-downlink configuration may be retained (configured) beforehand for only the unlicensed band, and be transmitted from the mobile station device 1 as a terminal capability information (UECapabilityInformation) message. That is, the features related to the uplink-downlink configurations 0 to 7 and/or the features related to the uplink-downlink configuration 7 may be supported only in the unlicensed band.

Monitoring of the PDCCH/EPDCCH is described below.

The base station device 3 transmits the physical layer control information (for example, the DCI format) to the mobile station device 1 on the PDCCH/EPDCCH. The physical layer control information (for example, the DCI format) is transmitted and received in a common search space (CSS) or a UE-specific search space (USS).

The CSS is a region in which the plurality of mobile station devices 1 monitor the PDCCH/EPDCCH in common. The USS is a region defined on the basis of at least the C-RNTI. The C-RNTI is an identifier uniquely allocated to the mobile station device 1.

The monitoring of the PDCCH/EPDCCH with the CIF means attempting to decode the PDCCH or the EPDCCH according to the DCI format including the CIF. The CIF is a field to which a carrier indicator is mapped. The value of the carrier indicator indicates the serving cell to which the DCI format associated with the carrier indicator corresponds.

The mobile station device 1 that is configure so as to monitor the PDCCH/EPDCCH with the CIF corresponding to the serving cell in a different serving cell monitors the PDCCH/EPDCCH with the CIF in the different serving cell.

The mobile station device 1 that is not configure so as to monitor the PDCCH/EPDCCH with the CIF corresponding to the serving cell in the different serving cell monitors the PDCCH/EPDCCH with or without the CIF in the serving cell.

The base station device 3 transmits, to the mobile station device 1, a parameter (cif-Presence-r10) indicating whether or not the CIF is included in the DCI format transmitted in the primary cell.

For each secondary cell, the base station device 3 transmits, to the mobile station device 1, a parameter (CrossCarrierSchedulingConfig-r10) relating to cross carrier scheduling.

The parameter (CrossCarrierSchedulingConfig-r10) includes a parameter (schedulingCellInfo-r10) indicating whether or not the PDCCH/EPDCCH corresponding to a related secondary cell is transmitted in the secondary cell or is transmitted in a different serving cell.

In a case where the parameter (schedulingCellInfo-r10) indicates that the PDCCH/EPDCCH corresponding to a related secondary cell is transmitted in the secondary cell, the parameter (schedulingCellInfo-r10) includes a parameter (cif-Presence-r10) indicating whether or not the CIF is included in the DCI format transmitted in the secondary cell.

In a case where the parameter (schedulingCellInfo-r10) indicates that the PDCCH/EPDCCH corresponding to a related secondary cell is transmitted in a different serving cell, the parameter (schedulingCellInfo-r10) includes a parameter (schedulingCellId) indicating, in which serving cell, the downlink allocation for the related secondary cell is sent.

Here, no uplink subframe is present in a serving cell for which the uplink-downlink configuration 7 is configured. This eliminates the need for the monitoring of the PDCCH/EPDCCH that includes PUSCH resource allocation (uplink grant) to the serving cell.

Here, the serving cell for which the uplink-downlink configuration 7 is configured may monitor the PDCCH/EPDCCH that includes PUSCH resource allocation (uplink grant) to a different serving cell. That is, in the serving cell for which the uplink-downlink configuration 7 is configured, the PDCCH/EPDCCH with the CIF may be monitored.

A detailed description of the primary secondary cell is given below.

The primary secondary cell is a cell used in dual connectivity. Dual connectivity is an operation whereby a prescribed terminal device is configured to utilize radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in an RRC connected (RRC_CONNECTED) state.

In dual connectivity, a base station device that is connected to at least the S1-MME and that acts as the mobility anchor of the core network is referred to as "master base station device". Additionally, a base station device, which is not the master base station device, that provides supplemental radio resources to the terminal device is referred to as "secondary base station device". A group of serving cells that is associated with the master base station device may be referred to as "master cell group" (MCG), and a group of secondary cells that is associated with the secondary base station device may be referred to as "secondary cell group" (SCG). Note that the cell groups may be serving cell groups.

In dual connectivity, the primary cell belongs to the MCG Additionally, in the SCG, the secondary cell that corresponds to the primary cell is referred to as "primary secondary cell" (pSCell). Note that the pSCell may be referred to as "special cell" or "special secondary cell" (Special SCell). Some of the features (for example, features for transmitting and receiving the PUCCH) of the PCell (the base station device constituting the PCell) may be supported in the Special SCell (the base station device constituting the Special SCell). Additionally, some of the features of the PCell may be supported in the pSCell. For example, the feature for transmitting the PDCCH may be supported in the pSCell. Additionally, the feature for transmitting the PDCCH may be supported in the pSCell using a search space different than the CSS or the USS. For example, the search space different than the USS is a search space determined on the basis of a value defined in the specification, a search space determined on the basis of an RNTI different than the C-RNTI, a search space determined on the basis of a value configured by a higher layer that is different than the RNTI, or the like. Additionally, the pSCell may constantly be in an activated state. Additionally, the pSCell is a cell capable of receiving the PUCCH.

In dual connectivity, the data radio bearer (DRB) may be individually allocated to the MeNB and the SeNB. On the other hand, the signalling radio bearer (SRB) may be allocated to only the MeNB. In dual connectivity, the MCG and the SCG or the PCell and the pSCell may individually be configured to be in a duplex mode. In dual connectivity, the MCG and the SCG or the PCell and the pSCell need not necessarily be synchronized with each other. In dual connectivity, a plurality of parameters for timing adjustment (TAG: Timing Advance Group) may be configured in each of the MCG and the SCG. In other words, the terminal device is capable of performing uplink transmission at a plurality of different timings in each CG.

In dual connectivity, the terminal device is allowed to transmit the UCI corresponding to the cells in the MCG only to the MeNB (the PCell) and to transmit the UCI corresponding to the cells in the SCG only to SeNB (the pSCell). For example, the UCI is an SR, a HARQ-ACK, and/or CSI. Additionally, in each UCI transmission, a transmission method using the PUCCH and/or the PUSCH is applied to each cell group.

All signals can be transmitted and received in the primary cell, but some signals cannot be transmitted and received in the secondary cell. For example, the physical uplink control channel (PUCCH) is transmitted only in the primary cell. Additionally, unless a plurality of timing advance groups (TAG) is configured between the cells, the physical random access channel (PRACH) is transmitted only in the primary cell. Additionally, the physical broadcast channel (PBCH) is transmitted only in the primary cell. Additionally, the master information block (MIB) is transmitted only in the primary cell. Signals that can be transmitted and received in the primary cell are transmitted and received in the primary secondary cell. For example, the PUCCH may be transmitted in the primary secondary cell. Additionally, the PRACH may be transmitted in the primary secondary cell, regardless of whether a plurality of TAGs are configured. Additionally, the PBCH and the MIB may be transmitted in the primary secondary cell.

Radio link failure (RLF) is detected in the primary cell. Even if conditions for the detection of an RLF are in place in the secondary cell, the detection of the RLF is not recognized. However, if the conditions are in place in the primary secondary cell, the RLF is detected. When an RLF is detected in the primary secondary cell, the higher layer of the primary secondary cell notifies the higher layer of the primary cell that the RLF has been detected. Semi-persistent scheduling (SPS) or discontinuous Transmission (DRX) may be used in the primary cell. The same DRX as in the primary cell may be used in the secondary cell. Fundamentally, in the secondary cell, the MAC configuration information/parameters are shared with the primary cell/primary secondary cell of the same group. Some of the parameters (for example, sTAG-Id) may be configured for each secondary cell. Some of the timers or counters may be applied only to the primary cell and/or the primary secondary cell. A timer or counter to be applied only to the secondary cell may be configured.

Accordingly, in a radio communication system in which the supplemental uplink-downlink configuration can be used, the mobile station device 1 can efficiently communicate with the base station device 3.

A program running on each of the base station device 3 and the mobile station device 1 according to the present invention may be a program that controls a central processing unit (CPU) and the like (a program for causing a computer to operate) in such a manner as to realize the functions according to the above-described embodiment of the present invention. In this case, the information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Moreover, the mobile station device 1 and the base station device 3 according to the above-described embodiment may be partially realized by the computer. This configuration may be realized by recording a program for realizing such control functions on a computer-readable medium and causing a computer system to read the program recorded on the recording medium for execution.

Moreover, the "computer system" here is defined as a computer system built into the mobile station device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the mobile station device 1 according to the above-described embodiment can also communicate with the base station device as the aggregation.

Furthermore, the base station device 3 according to the above-described embodiment may be an evolved universal terrestrial radio access network (E-UTRAN). Furthermore, the base station device 3 according to the above-described embodiment may have some or all portions of a function of a node higher than an eNodeB.

Furthermore, some or all portions of each of the mobile station device 1 and the base station device 3 according to the above-described embodiment may be realized as an LSI that is a typical integrated circuit or may be realized as a chip set. The functional blocks of each of the mobile station device 1 and the base station device 3 may be individually realized as a chip, or some or all of the functional blocks may be integrated into a chip. Furthermore, a circuit integration technique is not limited to the LSI, and the integrated circuit for the functional block may be realized with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the mobile station device is described as one example of a mobile station device or a communication device, but the present invention is not limited to this, and can be applied to a mobile station device or a communication device such as a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

REFERENCE SIGNS LIST 1 (1A, 1B, 1C) Mobile station device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Subframe setting unit
1015 Scheduling information interpretation unit
1017 CSI report control unit
3011 Radio resource control unit
3013 Subframe setting unit
3015 Scheduling unit
3017 CSI report control unit

The invention claimed is:
1. A terminal device comprising:
reception circuitry that receives a terminal capability enquiry (UECapabilityEnquiry) on a primary cell on which a Radio Resource Control connection between the terminal device and a base station device has been established; and transmission circuitry that transmits a terminal capability information (UECapabilityInformation) message on the primary cell in response to the terminal capability enquiry; wherein the terminal capability information message includes a terminal capability (UE-EUTRA-Capability) information element;

the terminal capability information element includes a field indicating whether or not the terminal device supports a downlink operation in a secondary cell operating in an unlicensed band; and the secondary cell operating in the unlicensed band is a cell on which listen before talk is applied prior to a downlink transmission.

2. The terminal device according to claim 1, wherein the secondary cell operating in the unlicensed band is a cell operating in an operating band corresponding to a prescribed index.

3. The terminal device according to claim 1, wherein the secondary cell operating in the unlicensed band is limited to a downlink transmission.

4. The terminal device according to claim 1, wherein the secondary cell operating in the unlicensed band is a TDD cell; and all subframes within a radio subframe of the secondary cell are available for downlink transmissions.

5. The terminal device according to claim 1, wherein the downlink operation is a downlink operation in all downlink subframes of the secondary cell operating in the unlicensed band; and the secondary cell operating in the unlicensed band is a TDD cell.

6. A base station device comprising:

transmission circuitry that transmits a terminal capability enquiry (UECapabilityEnquiry) on a primary cell on which a Radio Resource Control connection between a terminal device and the base station device has been established; and reception circuitry that receives a terminal capability information (UECapabilityInformation) message on the primary cell in response to the terminal capability enquiry; wherein the terminal capability information message includes a terminal capability (UE-EUTRA-Capability) information element;

the terminal capability information element includes a field indicating whether or not the terminal device supports a downlink operation in a secondary cell operating in an unlicensed band; and the secondary cell operating in the unlicensed band is a cell on which listen before talk is applied prior to a downlink transmission.

7. The base station device according to claim 6, wherein the secondary cell operating in the unlicensed band is a cell operating in an operating band corresponding to a prescribed index.

8. The base station device according to claim 6, wherein the secondary cell operating in the unlicensed band is limited to a downlink transmission.

9. The base station device according to claim 6, wherein the secondary cell operating in the unlicensed band is a TDD cell and all subframes within a radio subframe of the secondary cell are available for downlink transmissions.

10. The base station device according to claim 6, wherein the downlink operation is a downlink operation in all downlink subframes of the secondary cell operating in the unlicensed band, and the secondary cell operating in the unlicensed band is a TDD cell.

11. A method performed by a terminal device comprising:

receiving a terminal capability enquiry (UECapabilityEnquiry) on a primary cell on which a Radio Resource Control connection between the terminal device and a base station device has been established; and transmitting a terminal capability information (UECapabilityInformation) message on the primary cell in response to the terminal capability enquiry; wherein the terminal capability information message includes a terminal capability (UE-EUTRA-Capability) information element;

the terminal capability information element includes a field indicating whether or not the terminal device supports a downlink operation in a secondary cell operating in an unlicensed band; and the secondary cell operating in the unlicensed band is a cell on which listen before talk is applied prior to a downlink transmission.

12. A method performed by a base station device comprising:

transmitting a terminal capability enquiry (UECapabilityEnquiry) on a primary cell on which a Radio Resource Control connection between a terminal device and the base station device has been established; and receiving a terminal capability information (UECapabilityInformation) message on the primary cell in response to the terminal capability enquiry; wherein the terminal capability information message includes a terminal capability (UE-EUTRA-Capability) information element;

the terminal capability information element includes a field indicating whether or not the terminal device supports a downlink operation in a secondary cell operating in an unlicensed band; and the secondary cell operating in the unlicensed band is a cell on which listen before talk is applied prior to a downlink transmission.

* * * * *